(12) United States Patent
Grey et al.

(10) Patent No.: US 11,297,988 B2
(45) Date of Patent: Apr. 12, 2022

(54) BAGGED VACUUM CLEANER

(71) Applicant: GREY TECHNOLOGY LIMITED, Warndon (GB)

(72) Inventors: Nicholas Gerald Grey, Warndon (GB); Morteza Ghanizadeh Abry, Warndon (GB)

(*) Notice: Subject to any disclaimer, the term of this patent is extended or adjusted under 35 U.S.C. 154(b) by 226 days.

(21) Appl. No.: 16/606,757

(22) PCT Filed: Apr. 20, 2018

(86) PCT No.: PCT/GB2018/051045
§ 371 (c)(1),
(2) Date: Oct. 20, 2019

(87) PCT Pub. No.: WO2018/193268
PCT Pub. Date: Oct. 25, 2018

(65) Prior Publication Data
US 2020/0060490 A1    Feb. 27, 2020

(30) Foreign Application Priority Data

Apr. 21, 2017 (GB) ..................... 1706357

(51) Int. Cl.
*A47L 9/14* (2006.01)
*A47L 5/24* (2006.01)
(Continued)

(52) U.S. Cl.
CPC ............... *A47L 9/1427* (2013.01); *A47L 5/24* (2013.01); *A47L 9/19* (2013.01); *A47L 9/248* (2013.01);
(Continued)

(58) Field of Classification Search
CPC . A47L 5/24; A47L 9/1427; A47L 9/19; A47L 9/24; A47L 9/248; A47L 9/2884; A47L 9/322; H01M 2220/30; H01M 50/20
See application file for complete search history.

(56) References Cited

U.S. PATENT DOCUMENTS 6,009,594 A    1/2000  Grey
6,055,701 A    5/2000  Grey et al.
(Continued)

FOREIGN PATENT DOCUMENTS

CN    101785649 A      7/2010
CN    201631116 U   *  11/2010
JP    2006095210 A  *  4/2006

OTHER PUBLICATIONS

JP-2006095210-A—English machine translation (Year: 2006).*
(Continued)

*Primary Examiner* — Marc Carlson
(74) *Attorney, Agent, or Firm* — Pedersen and Company, PLLC; Ken J. Pedersen; Barbara S. Pedersen

(57) ABSTRACT

This invention relates to a bagged vacuum cleaner, i.e. to a vacuum cleaner in which dirt and debris is collected in a disposable bag. The vacuum cleaner (10) has a body (12), the body having a dirt-collection chamber (26), a motor (14) and an impeller (16). The body also has an inlet duct (30) upstream of the dirt-collection chamber, the inlet duct being connected to an inlet tube (36) adapted to fit to an opening of the disposable bag. A wall (40) of the inlet duct adjacent to the inlet tube (36) is transparent so that a user can look through the wall and into the inlet tube to observe whether or not the bag is full.

17 Claims, 6 Drawing Sheets

(51) Int. Cl.
    *A47L 9/19*     (2006.01)
    *A47L 9/24*     (2006.01)
    *A47L 9/28*     (2006.01)
    *A47L 9/32*     (2006.01)
    *H01M 2/10*     (2006.01)
    *H01M 50/20*    (2021.01)

(52) U.S. Cl.
    CPC .............. *A47L 9/2884* (2013.01); *A47L 9/322* (2013.01); *H01M 50/20* (2021.01); *H01M 2220/30* (2013.01)

(56) References Cited

U.S. PATENT DOCUMENTS

| | | | |
|---|---|---|---|
| 6,101,668 A | 8/2000 | Grey | |
| 6,243,912 B1 | 6/2001 | Grey | |
| 6,277,165 B1 | 8/2001 | Lovett et al. | |
| 6,949,130 B1 | 9/2005 | Grey et al. | |
| 6,968,587 B2 | 11/2005 | Grey | |
| 7,013,521 B2 | 3/2006 | Grey | |
| 7,017,221 B1 | 3/2006 | Grey et al. | |
| 7,117,556 B2 | 10/2006 | Grey | |
| D554,814 S | 11/2007 | Grey | |
| 7,331,078 B2 | 2/2008 | Grey | |
| 7,334,284 B2 | 2/2008 | Grey | |
| D568,008 S | 4/2008 | Grey | |
| 7,802,343 B2 | 9/2010 | Grey | |
| D694,481 S | 11/2013 | Grey et al. | |
| 9,149,165 B2 * | 10/2015 | Krebs | A47L 9/165 |
| 9,560,944 B2 | 2/2017 | Grey | |
| 9,737,183 B2 | 8/2017 | Grey | |
| 9,943,199 B2 | 4/2018 | Grey et al. | |
| 2004/0074027 A1 | 4/2004 | Grey | |
| 2005/0081323 A1 | 4/2005 | Nam et al. | |
| 2005/0138764 A1 | 6/2005 | Grey | |
| 2005/0204492 A1 | 9/2005 | Grey | |
| 2006/0000040 A1 | 1/2006 | Grey et al. | |
| 2007/0113528 A1 * | 5/2007 | Knuth | A47L 9/1427 55/472 |
| 2008/0022485 A1 | 1/2008 | Grey | |
| 2008/0040883 A1 | 2/2008 | Beskow et al. | |
| 2009/0300873 A1 | 12/2009 | Grey | |
| 2014/0237759 A1 * | 8/2014 | Conrad | A47L 5/32 15/344 |
| 2017/0071426 A1 | 3/2017 | Krebs et al. | |
| 2017/0215663 A1 * | 8/2017 | Conrad | A47L 5/30 |
| 2019/0029482 A1 | 1/2019 | Grey et al. | |
| 2019/0307301 A1 * | 10/2019 | Conrad | A47L 5/362 |

OTHER PUBLICATIONS

CN-201631116-U—English machine translation (Year: 2010).*
PCT International Search Report, PCT/GB2018/051045, Applicant: Grey Technology Limited, dated Sep. 7, 2018.
Search Report for GB1806476.6, Applicant: Grey Technology Limited, dated Nov. 8, 2018, Intellectual Property Office, UK.

* cited by examiner

BAGGED VACUUM CLEANER

FIELD OF THE INVENTION

This invention relates to a bagged vacuum cleaner, i.e. to a vacuum cleaner in which dirt and debris is collected in a disposable bag.

The invention is particularly directed to a hand-held vacuum cleaner and the drawings show a hand-held vacuum cleaner. It will be understood, however, that the invention is applicable to all bagged vacuum cleaners.

In the following description, directional and orientational terms such as "top", "bottom", "above" etc. are to be understood in relation to the hand-held vacuum cleaner in its normal orientation of use as defined below (and as shown in FIG. 1).

BACKGROUND TO THE INVENTION

The owners or occupiers of many domestic and commercial premises utilise a vacuum cleaner to clean the floors and other areas of the premises. A vacuum cleaner operates by generating an air flow through a suction head which is placed upon or against the area to be cleaned. Dirt and debris become entrained in the air flow and are thereby carried into a dirt-collection chamber for subsequent disposal.

Most domestic vacuum cleaners fall into three broad classes. The first class is often referred to as cylinder vacuum cleaners. In cylinder vacuum cleaners the suction head is connected by way of a rigid tube to an operating handle which in turn is connected to a flexible hose through which the dirt and debris pass on their way to the dirt-collection chamber. The dirt-collection chamber is located within a body which also contains a motor and an impeller to create the air flow, the body having wheels or slides by which it may be pulled across the floor during the cleaning operation.

For the avoidance of doubt, the term "impeller" as used in this specification embraces all devices for creating air flow within the vacuum cleaner. The term therefore also includes fans and turbines for example.

The second class is often referred to as upright vacuum cleaners. In upright vacuum cleaners the motor, impeller and dirt-collection chamber are carried by, or in some cases are integral with, the operating handle, so that the body containing the motor, impeller and the dirt-collection chamber typically lie above the suction head during the cleaning operation.

It is not possible to manoeuvre the suction head of an upright vacuum cleaner in the same way as that of a cylinder vacuum cleaner, and in order to enable the cleaning of areas such as stairs the manufacturers of upright vacuum cleaners provide an alternative solution. Specifically, the upright vacuum cleaner is typically fitted with a length of extendable flexible hose between the suction head and the dirt-collection chamber, the end of the hose adjacent to the suction head being releasable whereby the end of the released hose can be fitted with a cleaning tool and manoeuvred to the desired location without the user having to move the remainder of the vacuum cleaner. The flexible hose is typically made extendable so that during normal use of the vacuum cleaner the contracted hose can be stored easily and conveniently upon the body of the vacuum cleaner. When released from its stored position the hose can be extended to reach the desired location.

Most cylinder vacuum cleaners, and most upright vacuum cleaners, are mains-powered. The suction head of a cylinder vacuum cleaner, and the released end of the extendable flexible hose of an upright vacuum cleaner, are manoeuvrable relative to the body of the vacuum cleaner within the limit set by the length of the extended hose. Also, the body of the vacuum cleaner is only manoeuvrable within the limit set by the length of the mains electrical cable (and the availability of mains electricity sockets). It may therefore not be possible to move the suction head or cleaning tool to all of the locations in which cleaning is desired.

A third class of vacuum cleaner is a hand-held vacuum cleaner. Hand-held vacuum cleaners are typically battery-operated and have a carrying handle which permits the whole vacuum cleaner to be carried during use (typically by one hand), the user being able to manoeuvre the nozzle of the vacuum cleaner to the location of use.

Hand-held vacuum cleaners were originally designed to supplement mains-powered vacuum cleaners and were suited for use in cleaning areas which were difficult to reach with the suction head or cleaning tool of a mains-powered vacuum cleaner, and for small-area or spot cleaning such as clearing up the spillage of a granular product.

Advances in battery technology and improvements in the design of hand-held vacuum cleaners have resulted in reductions in weight and an increase in the periods of use between recharging of the batteries, both of which make hand-held vacuum cleaners more suited to extended periods of use and therefore for the cleaning of larger areas. The utility of hand-held vacuum cleaners has therefore increased and some hand-held vacuum cleaners can nowadays be used as an alternative to a mains-powered vacuum cleaner to clean floors and the like. In particular, a hand-held vacuum cleaner can be adapted to clean floors by including a rigid tube between the suction head and the body of the vacuum cleaner, in a configuration often referred to as a "stick-vac".

The suction head of all three classes of vacuum cleaner can be fitted with a rotating brush which is designed to engage and physically move dirt and debris into the suction head where it can be entrained in the air flow. Also, the suction head can incorporate a steering joint allowing it to be steered in a chosen direction during use.

Vacuum cleaners are also distinguished by their treatment of the collected dirt and debris. "Bagged" vacuum cleaners have a disposable bag located in the dirt-collection chamber, the impeller drawing air through the bag during use. The wall of the bag is of paper or fabric and provides a first-stage filter allowing air to pass through whilst retaining most of the dirt and debris within the bag. When the bag is full it is removed from the dirt-collection chamber and disposed along with the contained dirt and debris.

"Bagless" vacuum cleaners on the other hand separate the dirt and debris from the air flow within the dirt collection chamber, typically by way of a cyclonic separator. The air passes out of the dirt-collection chamber and most of the dirt and debris is retained in the chamber. The dirt-collection chamber is typically removably mounted to the body and when full it can be removed and taken to a site of disposal, for example a waste bin, where it is opened to allow the contained dirt and debris to be emptied. The empty dirt-collection chamber is reinstalled into the body for re-use.

It is recognised that the bag and the cyclonic separator may not capture very fine dirt and dust and a second stage filter is often included, usually upstream of the impeller.

It is common to provide the dirt collection chamber of a bagless vacuum cleaner with a transparent wall so that the user can readily and directly see how full the dirt-collection chamber is becoming and can empty the dirt-collection chamber as and when required.

A transparent wall for the dirt-collection chamber is of no benefit for a bagged vacuum cleaner, however, since the bag is opaque. The manufacturers of bagged vacuum cleaners therefore provide other means of alerting the user to a full bag. Some bagged vacuum cleaners have an optical transmitter and an optical receiver in the inlet duct immediately adjacent to the bag opening, a full bag (or a blocked inlet duct) being indicated by material between the transmitter and receiver which blocks the passage of light. It is known, however, that such sensors become unreliable over time as dust and dirt coats the inlet duct and covers the transmitter and/or the receiver.

Other bagged vacuum cleaners have air flow sensors to measure the rate of air flow through the bag. The rate of air flow will decrease as the bag fills and the air is required to pass through an increasing mass of collected dirt and debris as well as through the wall of the bag, so that the air flow can be utilised as an indicator of the amount of dirt and debris in the bag.

The reduction in air flow will, however, depend somewhat upon the dirt and debris which is being collected. For example, the reduction in flow rate will differ between a bag which is filled mostly with hair and fluff, a bag which is filled mostly with fine dust or other small-scale material, and a bag which is filled mostly with paper or other large-scale material. It is therefore not uncommon for the user of a vacuum cleaner fitted with this type of sensor to be prompted to dispose of a bag which is only partially full.

There are bagged and bagless vacuum cleaners of all three of the broad classes mentioned above.

SUMMARY OF THE INVENTION

The object of the present invention is to enable the user more accurately to determine the amount of dirt and debris in the bag of a bagged vacuum cleaner. In particular, the object is to enable the user to directly determine when the bag is full rather than relying upon an indirect determination such as air flow.

According to the invention there is provided a vacuum cleaner having a body, the body having a dirt-collection chamber, a motor and an impeller, the body having an inlet duct upstream of the dirt-collection chamber, the inlet duct being connected to an inlet tube adapted to fit to an opening of a disposable bag, a wall of the inlet duct adjacent to the inlet tube being transparent.

The inventor has appreciated that it is not necessary for the user to see through the wall of the bag in order to determine the amount of dirt and debris in the bag, and nor is it generally necessary for the user to know when the bag is half-full for example. Instead, it is generally only necessary that the user knows when the bag is full or very nearly full, and that can be determined by looking into the bag opening. The vacuum cleaner necessarily has a (substantially rigid) inlet tube to which the (flexible) opening of the bag can be secured, and making a part of the adjacent inlet duct transparent enables the user to look into the bag opening and to directly observe the dirt and debris adjacent to the bag opening as the bag becomes full. When the user sees dirt and debris at the bag opening he or she will know that the bag is full and requires emptying.

The transparent wall will also permit the user to observe if the inlet duct becomes blocked before the bag is full, allowing quick remedial action to remove the blockage.

Preferably, the vacuum cleaner is a hand-held vacuum cleaner, the body also having a carrying handle. Desirably the motor is located below the carrying handle, and ideally immediately below the carrying handle. Desirably also, the batteries are located adjacent to the carrying handle, and ideally in the carrying handle. It is recognised that the motor and batteries are typically the heaviest components of a hand-held vacuum cleaner. Locating these components close to the carrying handle reduces their offset weight and reduces the user's fatigue during use of the vacuum cleaner.

Preferably also, the inlet tube is located at the top of the dirt-collection chamber and the motor and the impeller are located adjacent to the bottom of the dirt-collection chamber.

Desirably, the inlet duct is located at the top of the body. If the inlet duct and the inlet tube are both located at the top of the body the length of the inlet duct can be minimised so as to reduce pumping losses and minimise the likelihood of blockages. Also, the transparent wall can be at the top of the body of the vacuum cleaner and provide good visibility of the bag opening during use.

Preferably, the inlet duct has illuminating means, typically a light emitting diode. The provision of illumination will make it easier for the user to see dirt and debris adjacent to the bag opening. Also, it is recognised that dust and dirt will over time coat the inside surface of the inlet duct and will therefore reduce the transparency of the wall of the inlet tube. The provision of illuminating means somewhat counters the reduction in transparency and therefore reduces the requirement for the user to clean the inside surface (and also the outside surface) of the transparent wall.

In common with other hand-held vacuum cleaners, the inlet duct is connected to a nozzle. The nozzle may be placed against a surface to be cleaned directly, or it may mount a cleaning tool or a suction head. If used as a "stick-vac" one end of a rigid extension tube is connected to the nozzle and a suction head is connected to the other end of the tube. The transparent wall may be located so as to allow the user to look along the inside of the inlet duct and into the nozzle, permitting the user to observe directly the area being cleaned.

BRIEF DESCRIPTION OF THE PREFERRED EMBODIMENTS

The invention will now be described in more detail, by way of example, with reference to the accompanying drawings, in which.

DETAILED DESCRIPTION

Figure 1:
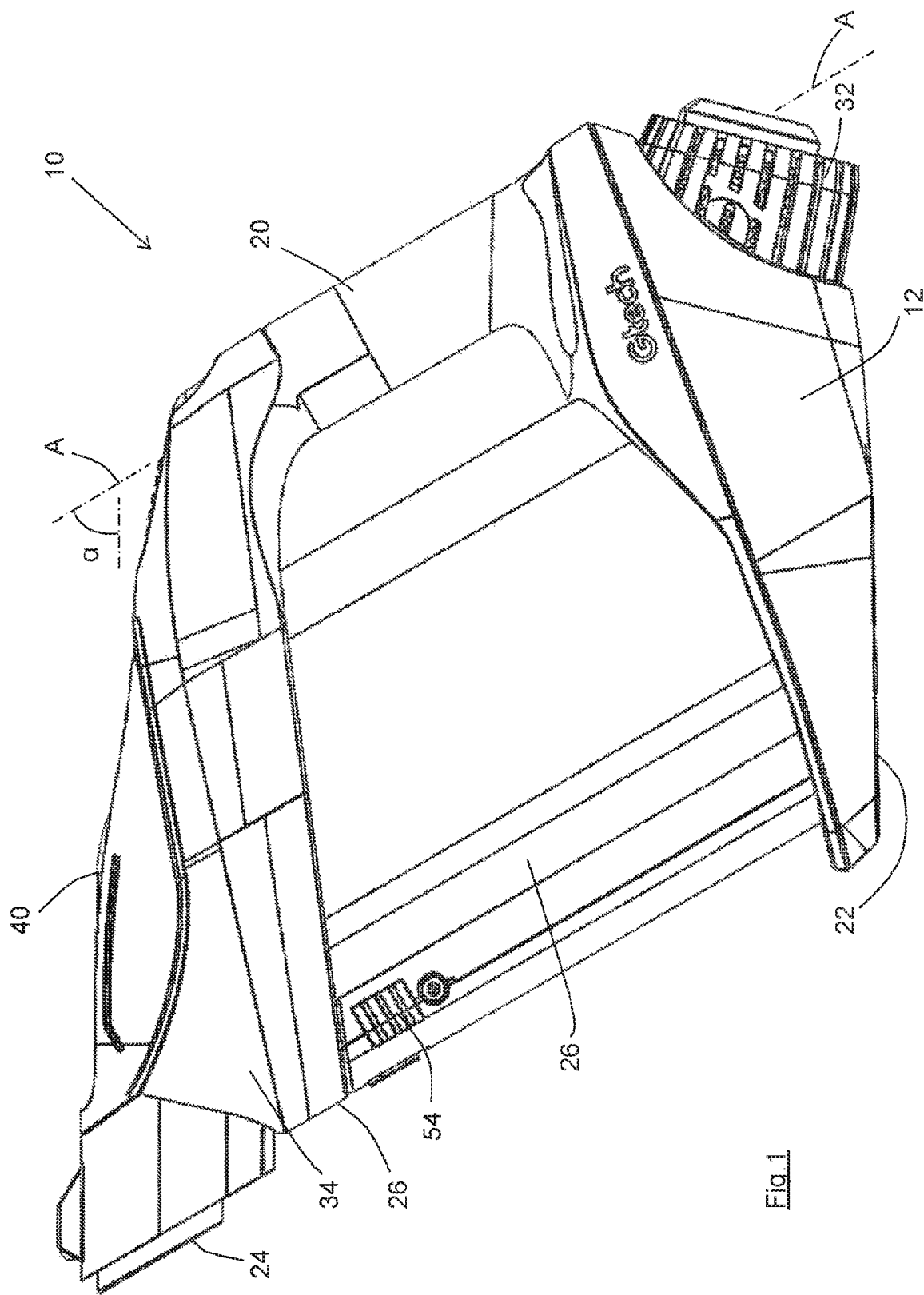
FIG. 1 shows a side view of the vacuum cleaner according to the invention.

The hand-held vacuum cleaner 10 shown in the drawings has a body 12. As seen in the sectional view of FIG. 2, the body 12 houses the motor 14 and impeller 16 which create the desired airflow. The body also houses the rechargeable battery (not shown) which provides the electrical power to the motor 14. In common with many battery-powered devices, the battery comprises a battery pack made up of a number of interconnected cells.

The body 12 has a carrying handle 20 by which the vacuum cleaner can be lifted and manoeuvred (one-handed) by the user. The carrying handle is substantially linear with a longitudinal axis A-A which is at an angle α to the base 22. Ideally the angle α is around 60°, but angles of between 50° and 80° will also be comfortable to the user.

Figure 2:
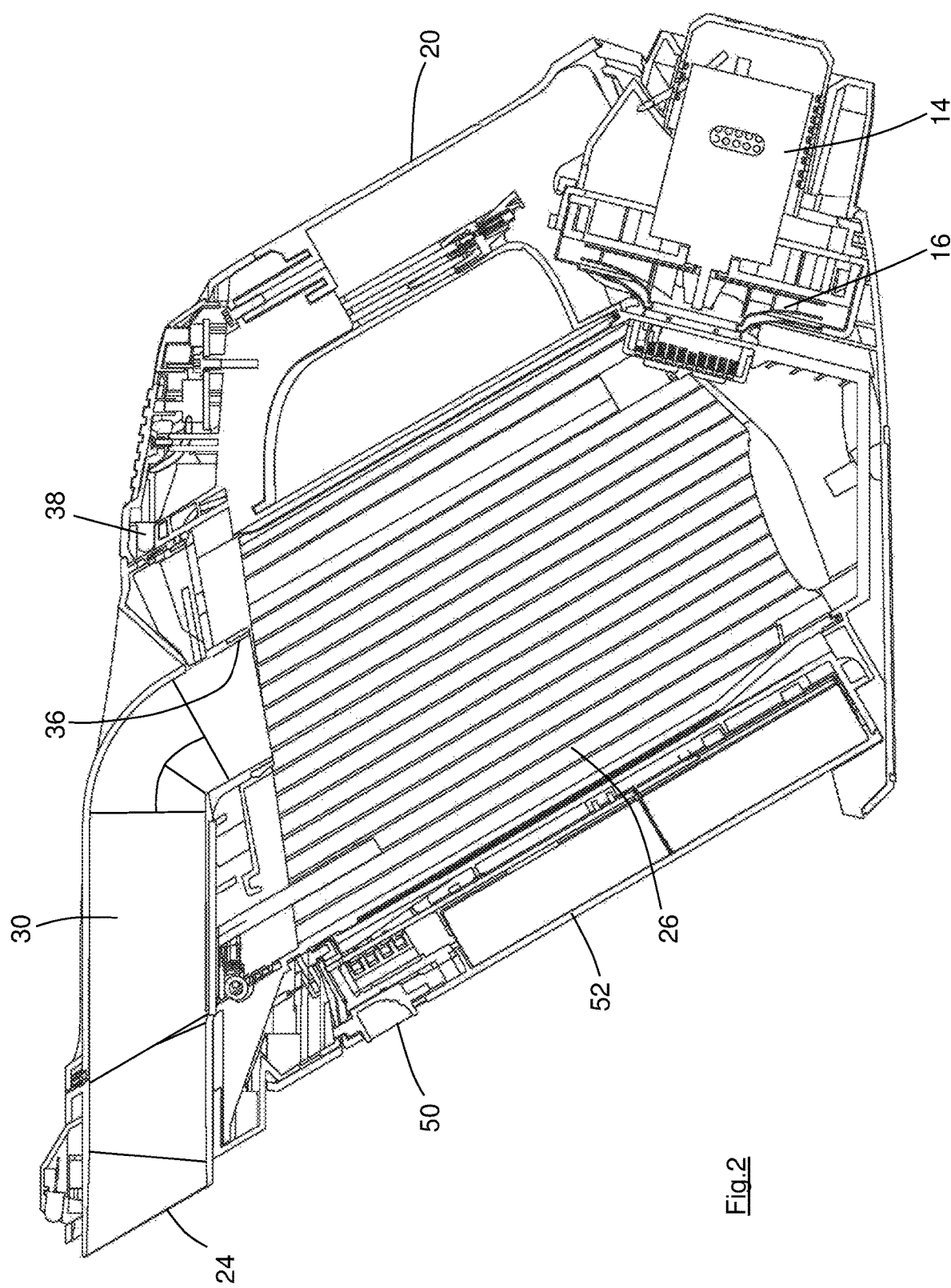
FIG. 2 shows a sectional view of the vacuum cleaner of FIG. 1.
Figure 3:
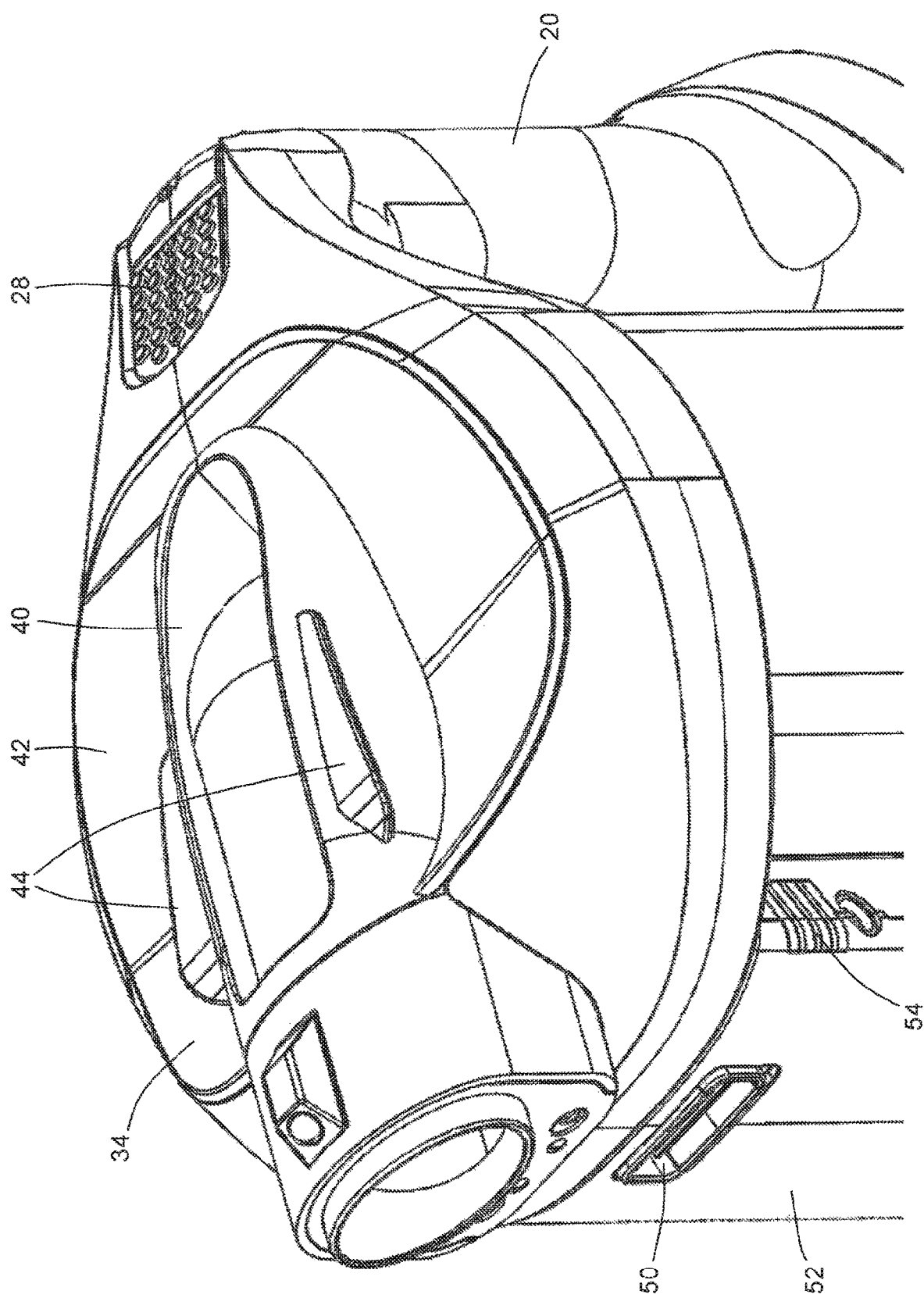
FIG. 3 shows a perspective view of the top of the vacuum cleaner of FIG. 1.

The base 22 is substantially flat and is designed to be the surface upon which the vacuum cleaner rests when not in use. The vacuum cleaner is therefore stable when resting with its base 22 upon a substantially horizontal surface such as during storage upon a shelf or the floor for example. Whilst it is understood that the vacuum cleaner can be manoeuvred and oriented as desired, for ease of reference the term "normal orientation" is used to describe the vacuum cleaner in an orientation with the base 22 substantially horizontal and with the handle 20 above the base as shown in FIGS. 1 and 2.

The battery pack can if desired be located inside the handle 20. In known fashion, the battery pack may be removable or non-removable as desired. In any event, it is desired that the battery pack can be recharged without removal.

The hand-held vacuum cleaner 10 has a nozzle 24. The nozzle may be applied directly to an area to be cleaned, or it may mount a cleaning tool such as a (removable) crevice tool or a dusting brush (not shown). Also, the nozzle may mount a (removable) suction head (also not shown). The suction head may be of known form and may be connected directly to the nozzle 24; alternatively, one end of a rigid extension tube (not shown) may be fitted to the nozzle 24, the other end of the extension tube carrying the suction head, in a "stick-vac" configuration. The suction head may incorporate a rotating brush, in which case the nozzle will preferably have electrical contacts to communicate electrical power from the battery along the extension tube to the suction head. The form of the suction head and cleaning tools which may be connected to the nozzle 24 is not relevant to the present invention.

The body 12 includes a dirt-collection chamber 26 which is designed to accommodate a disposable bag (not seen) in which collected dirt and debris accumulates.

It will be understood that locating the (relatively heavy) motor 14 below the handle 20, and locating the (relatively heavy) battery pack in the handle 20, results in the centre of gravity of the vacuum cleaner being close to the bottom end of the handle 20, which has been found to be comfortable for the user even over sustained periods of use.

An operating switch 28 is located adjacent to the top end of the carrying handle 20 where it can readily be depressed by a user's finger or thumb.

In use, air is drawn into the vacuum cleaner through the nozzle 24, along the inlet duct 30 and into the bag located in the dirt-collection chamber 26. The air passes through the air-permeable wall of the bag which acts as a first-stage filter to retain most of the dirt and debris within the bag. A second stage filter can be provided upstream of the impeller 16 if desired, the air passing the impeller before leaving the vacuum cleaner body 12 through an exhaust outlet 32. In this embodiment at least some of the air is directed past the motor 14 on its way to the exhaust 32, so as to cool the motor.

As seen most clearly in FIG. 2, the inlet duct 30 is relatively short, and has only a single bend. Reducing the length of the inlet duct, minimising the number and severity of the bends, and reducing or avoiding restrictions within the inlet duct, minimises the pumping losses, which is a valuable feature of a battery-powered vacuum cleaner.

Figure 6:
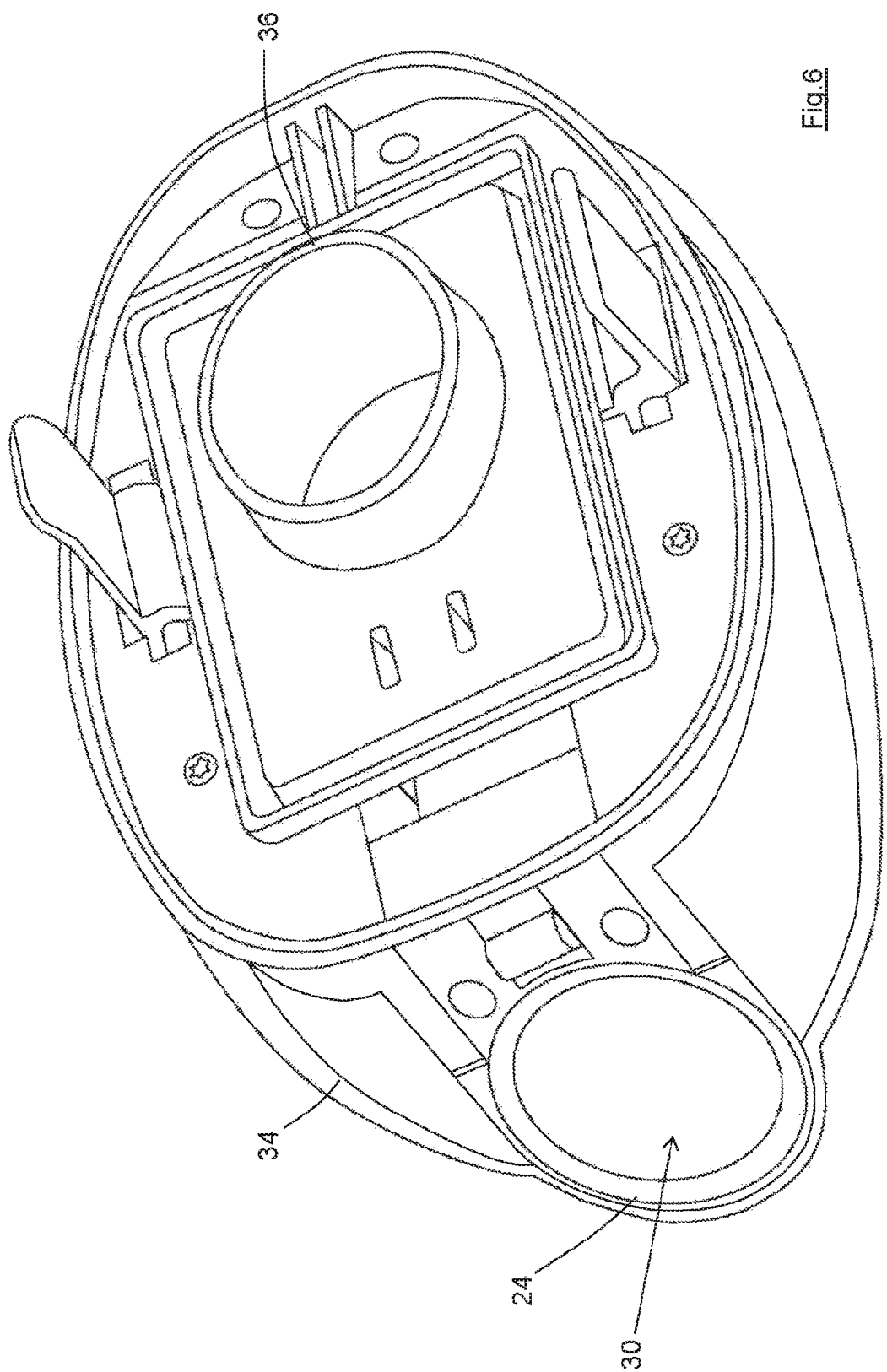
FIG. 6 shows an underside view of the top part of the vacuum cleaner.

FIG. 6 shows an underneath view of the top part of the body 12, i.e. the part above the dirt-collection chamber 26. That part includes the nozzle 24 and has a housing 34 which contains the inlet duct 30. As seen in FIG. 2, the inlet duct 30 is connected to an inlet tube 36 which is also carried by the housing 34. The inlet tube 36 is open into the interior of the dirt-collection chamber 26.

In known fashion the inlet tube 36 is a substantially rigid tube of circular cross-section, the circumference of the inlet tube being designed closely to match the circumferential length of the opening of the bag (not shown). The opening of the bag will typically have a flexible and resilient sealing member so as to form a substantially air-tight seal around the inlet tube 36, in known fashion.

Figure 4:
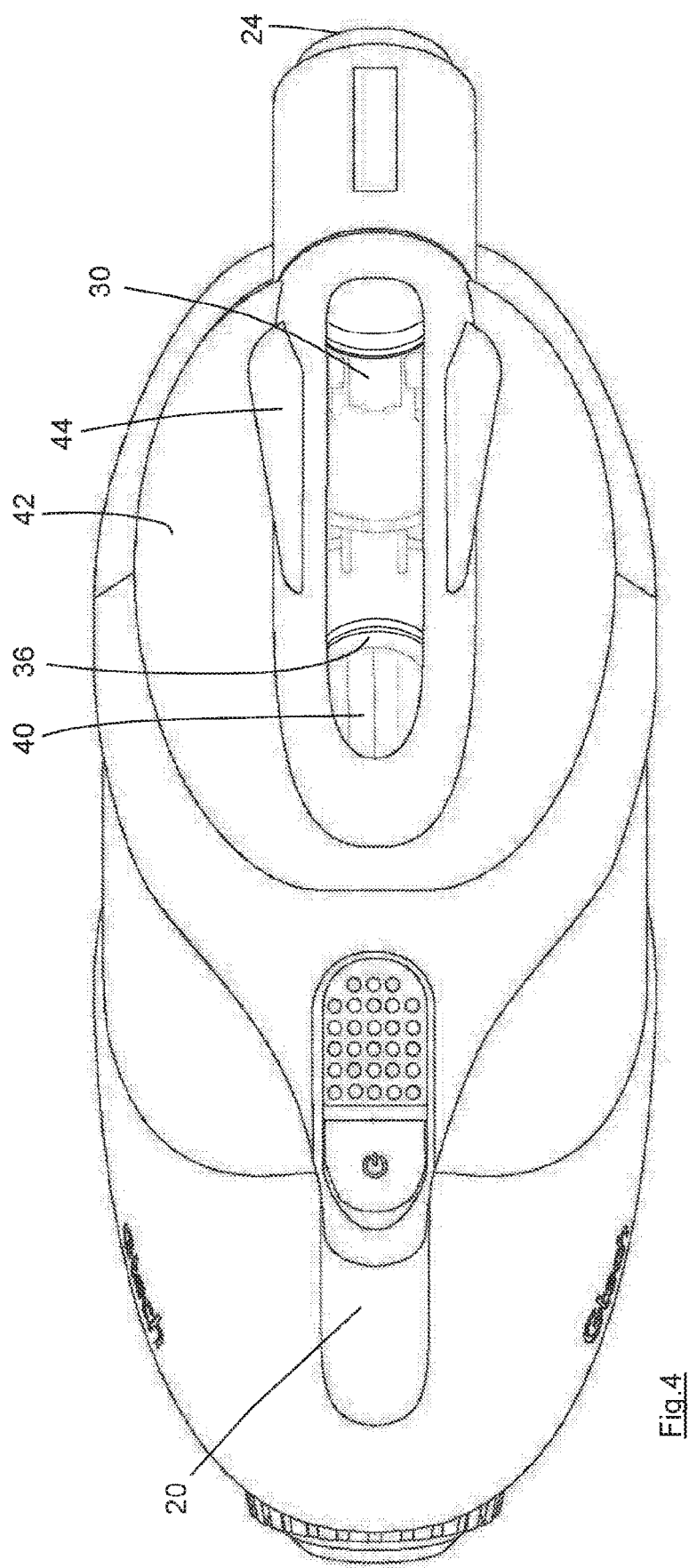
FIG. 4 shows a top view of the vacuum cleaner.
Figure 5:
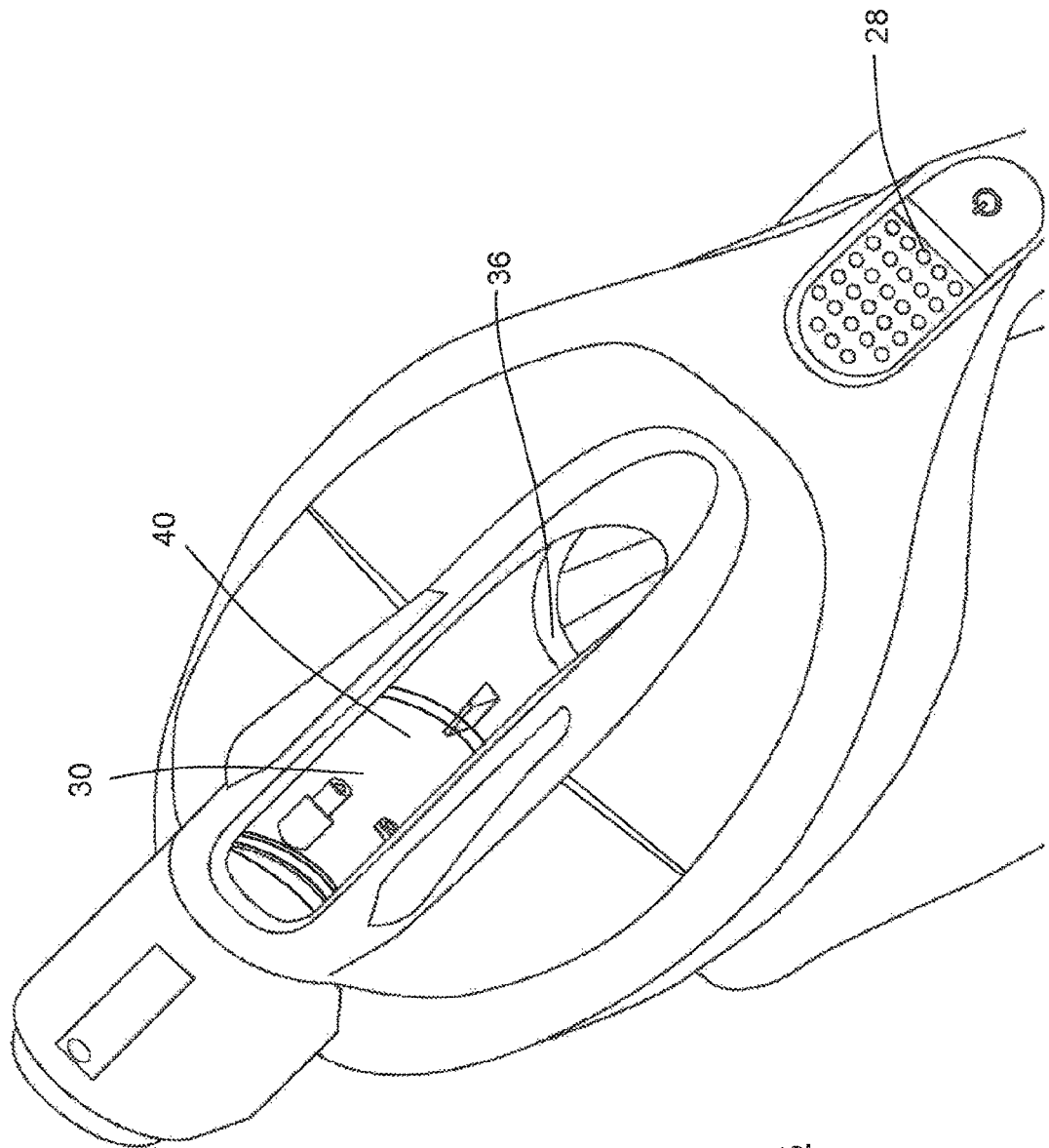
FIG. 5 shows a perspective view from above of the vacuum cleaner.

As will be seen from the representations of FIGS. 4 and 5 in particular, the inlet duct 30 is located at the top of the body 12 and has a transparent (top) wall 40 through which the inlet tube 36 can be seen. The user can therefore look through the transparent wall 40 and see whether there is dirt and debris filling the bag up to the level of the inlet tube 36 (and can see if there is dirt or debris blocking the inlet duct 30).

A light emitting diode 38 is located close to the inlet tube 36, which LED will illuminate the inlet tube 36 and the bag opening. The provision of a light will reduce the effect of any dirt and dust which coats the inside (or less likely the outside) of the transparent wall 40. The top cover 42 of the housing 34 is nevertheless removable, the top cover including the transparent wall 40, whereby to permit periodic cleaning of the inside surface of the transparent wall 40. In this embodiment the top cover 42 is retained by detents or clips (not seen), and can be held during removal, cleaning and replacement by way of the finger-grips 44.

When dirt and debris is observed to be accumulating up to (or close to) the inlet tube 36 the bag will require removal and replacement. The dirt-collection chamber 26 is opened by way of a latch 50 (FIG. 2), release of the latch 50 enabling the user to grasp the front wall 52 of the dirt-collection chamber by way of finger grips 54. When the front wall 52 of the dirt-collection 46 has been removed the user can access the full bag and release it from the inlet tube 36 for disposal, and can insert a replacement bag.

The invention claimed is:

1. A hand-held vacuum cleaner having a body, the body having a carrying handle, a dirt-collection chamber, a motor, an impeller and at least one battery for powering the motor, the body having a housing located at the top of the body and above the dirt-collection chamber, the housing containing an inlet duct which is upstream of the dirt-collection chamber, the inlet duct being connected at one of its ends to an inlet tube which is carried by the housing and which projects from the housing into the top of the dirt-collection chamber and is adapted to fit to an opening of a disposable bag, the inlet duct being connected at its other end to a nozzle which projects from the housing, a wall of the inlet duct adjacent to the inlet tube providing an exterior wall of the housing and being transparent.

2. A vacuum cleaner according to claim 1 in which the at least one battery is mounted in the carrying handle.

3. A vacuum cleaner according to claim 1 in which the motor is located below the carrying handle.

4. A vacuum cleaner according to claim 1 in which the motor and the impeller are located adjacent to the bottom of the dirt-collection chamber.

5. A vacuum cleaner according to claim 1 in which the body has a removable top.

6. A vacuum cleaner according to claim 5 in which the removable top comprises a part of the inlet duct including the transparent wall.

7. A vacuum cleaner according to claim 5 in which the removable top has a pair of finger grips.

8. A vacuum cleaner according to claim 1 in which the transparent wall is adjacent to the nozzle whereby a user can look through the transparent wall and through the nozzle.

9. A vacuum cleaner according to claim 1 having a light to illuminate the inlet duct.

10. A vacuum cleaner having a body, the body having a dirt-collection chamber, a motor and an impeller, the body having an inlet duct upstream of the dirt-collection chamber, the inlet duct being connected to an inlet tube adapted to fit to an opening of a disposable bag, a wall of the inlet duct adjacent to the inlet tube being transparent, in which the body has a removable top, in which the removable top has a pair of finger grips, and in which the transparent wall is located between the finger grips.

11. A vacuum cleaner according to claim 10 in which the body has a carrying handle.

12. A vacuum cleaner according to claim 11 having at least one battery for powering the motor.

13. A vacuum cleaner according to claim 12 in which the at least one battery is mounted in the carrying handle.

14. A vacuum cleaner according to claim 11 in which the motor is located below the carrying handle.

15. A vacuum cleaner according to claim 10 in which the inlet tube opens into the top of the dirt-collection chamber and the motor and the impeller are located adjacent to the bottom of the dirt-collection chamber.

16. A vacuum cleaner according to claim 10 in which the body has a nozzle, and in which the transparent wall is adjacent to the nozzle whereby a user can look through the transparent wall and through the nozzle.

17. A vacuum cleaner according to claim 10 having a light to illuminate the inlet duct.

\* \* \* \* \*